(12) United States Patent
Cavelier et al.

(10) Patent No.: US 11,981,096 B2
(45) Date of Patent: May 14, 2024

(54) METHOD OF REPAIRING THERMAL PROTECTION FOR A NACELLE STRUCTURE

(71) Applicant: SAFRAN NACELLES, Gonfreville-l'Orcher (FR)

(72) Inventors: Erika Cavelier, Moissy-Cramayel (FR); Julien Helin, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 246 days.

(21) Appl. No.: 17/753,629

(22) PCT Filed: Sep. 11, 2020

(86) PCT No.: PCT/FR2020/051571
§ 371 (c)(1),
(2) Date: Mar. 9, 2022

(87) PCT Pub. No.: WO2021/053286
PCT Pub. Date: Mar. 25, 2021

(65) Prior Publication Data
US 2022/0332065 A1    Oct. 20, 2022

(30) Foreign Application Priority Data

Sep. 16, 2019 (FR) ...................................... 1910184

(51) Int. Cl.
*B29C 73/10* (2006.01)
*B29C 73/26* (2006.01)
*B29L 31/30* (2006.01)

(52) U.S. Cl.
CPC ............. *B29C 73/10* (2013.01); *B29C 73/26* (2013.01); *B29C 2073/266* (2013.01); *B29L 2031/3076* (2013.01); *Y10T 156/1066* (2015.01); *Y10T 156/1074* (2015.01); *Y10T 428/20* (2015.01)

(58) Field of Classification Search
None
See application file for complete search history.

(56) References Cited

U.S. PATENT DOCUMENTS

| 4,978,404 A | 12/1990 | Westerman, Jr. |
| 2012/0205192 A1 | 8/2012 | Bornert-Dano |
| 2017/0113425 A1 | 4/2017 | Tardu et al. |

FOREIGN PATENT DOCUMENTS

| CN | 102635445 A | 8/2012 |
| CN | 207587708 U | 7/2018 |
| EP | 0258596 A2 | 3/1988 |
| EP | 1072376 A1 | 1/2001 |
| EP | 1072396 A2 | 1/2001 |
| FR | 3042779 A1 | 4/2017 |

(Continued)

OTHER PUBLICATIONS

French Search Report issued in French Application FR1910184 dated Jun. 2, 2020 (2 pages).

(Continued)

*Primary Examiner* — Alexander S Thomas
(74) *Attorney, Agent, or Firm* — Bookoff McAndrews, PLLC (57) ABSTRACT

The present invention relates to a method for repairing a damaged thermal protection covering a nacelle structure for an aircraft turbojet engine by adding a repair thermal insulation blanket as well as a repair sheet onto the damaged part.

7 Claims, 6 Drawing Sheets

(56) References Cited

FOREIGN PATENT DOCUMENTS

WO    2015036716 A1    3/2015

OTHER PUBLICATIONS

International Search Report and Written Opinion issued in International Application PCT/FR2020/051571 dated Jan. 19, 2021 (9 pages).
First Search in corresponding Chinese Application No. CN202080063179 dated Sep. 20, 2022 (2 pages).

METHOD OF REPAIRING THERMAL PROTECTION FOR A NACELLE STRUCTURE

CROSS-REFERENCE TO RELATED APPLICATIONS

This patent application is the U.S. National Stage entry under 35 U.S.C. § 371 of International Patent Application No. PCT/FR2020/051571, filed on Sep. 11, 2020, which claims the benfit of priority to French Patent Application No. 1910184, filed on Sep. 16, 2019, which is incorporated by reference herein in its entirety.

TECHNICAL FIELD

The present invention relates to a method for repairing a damaged thermal protection covering a nacelle structure for an aircraft turbojet engine.

PRIOR ART

The thermal protections of the aircraft turbojet engine nacelles comprise a thermal insulation blanket sandwiched between two sheets (also called "strips"). When damage to the thermal protection is observed, the thermal insulation blanket must be repaired before the turbojet engine can be used again. It is desirable to have a repair solution that is relatively simple and quick to implement in order in particular to be able to carry out the repair of the thermal protection during a stopover of the aircraft so as to limit the downtime of the latter.

DISCLOSURE OF THE INVENTION

The invention relates to a method for repairing a damaged thermal protection covering a nacelle structure for an aircraft turbojet engine, the damaged thermal protection comprising a thermal insulation blanket present between a first sheet and a second sheet, the second sheet being located on the side of the nacelle structure, the thermal insulation blanket and the first sheet each having an area of lack of material, the method comprising at least:
  the cutting of slots through the first sheet, the area of lack of material of the first sheet being present between the slots,
  the positioning of a repair thermal insulation blanket in the area of lack of material of the thermal insulation blanket,
  the positioning of a repair sheet after positioning of the repair thermal insulation blanket, the repair sheet comprising a central part and lateral tabs, a first sealing adhesive being applied on the lateral tabs, the positioning of said repair sheet being carried out by inserting the lateral tabs into the slots in order to interpose them between the thermal insulation blanket and the first sheet and to secure them to the first sheet by the first sealing adhesive, the central part covering the repair thermal insulation blanket after insertion of the lateral tabs into the slots, and
  the depositing of a second sealing adhesive on the contour of the repair sheet thus positioned.

The invention proposes to add a repair thermal insulation blanket into the damaged area of the blanket and to cover this repair blanket with a repair sheet added onto the first damaged sheet. In the invention, the repair sheet comprises tabs which are inserted between the thermal insulation blanket and the first sheet and which are secured by bonding to the first sheet by the first sealing adhesive. This solution of fixing by insertion of interposed and bonded tabs allows having a repair adapted to the engine environment particularly in terms of resistance to vibrations and fluid tightness while presenting a simple implementation, particularly not requiring riveting and also not requiring specific tools or supplies. The proposed repair solution further has the advantage of being feasible without detaching all or part of the nacelle or of the propulsion assembly from the wing of the aircraft, thus avoiding transport to a maintenance workshop and a cumbersome dismantling procedure. This solution allows the repair of the thermal protection during a stopover of the aircraft and thus limits the downtime of the latter.

In one exemplary embodiment, the repair sheet has cut-outs forming the lateral tabs. Such a characteristic advantageously allows further simplifying the implementation of the repair.

As a variant, the lateral tabs can be formed by elements added onto the repair sheet, for example welded thereto, and no longer by cutting of the repair sheet.

In one exemplary embodiment, the repair sheet comprises at least four tabs present around the central part, each of these tabs being inserted into a distinct slot of the first sheet.

In one exemplary embodiment, the slots are cut through the first sheet with a protective element interposed between a cutting area and the thermal insulation blanket.

Such a characteristic allows avoiding any risk of damage to the thermal insulation blanket during the cutting of the slots through the sheet, thus further improving the quality of the repair carried out.

In one exemplary embodiment, the second sheet also has an area of lack of material and the method further comprises:
  the positioning of a second repair sheet in the area of lack of material of the second sheet and its securing to the second sheet before the positioning of the repair thermal insulation blanket, the repair thermal insulation blanket covering once positioned the second repair sheet.

Such a characteristic corresponds to the case where the second sheet has been damaged and where a repair of the latter is also carried out.

In one exemplary embodiment, the damaged thermal protection is a damaged thermal and fire protection and covers an inner fixed structure of an aircraft turbojet engine nacelle. The invention is however not limited to the repair of this type of thermal protection. Indeed, as a variant, the damaged thermal protection covers an outer fixed structure of the aircraft turbojet engine nacelle.

For the sake of brevity, the expression "thermal insulation blanket" will be designated in the remainder of the description by the word "blanket".

DESCRIPTION OF THE EMBODIMENTS

Figure 1:
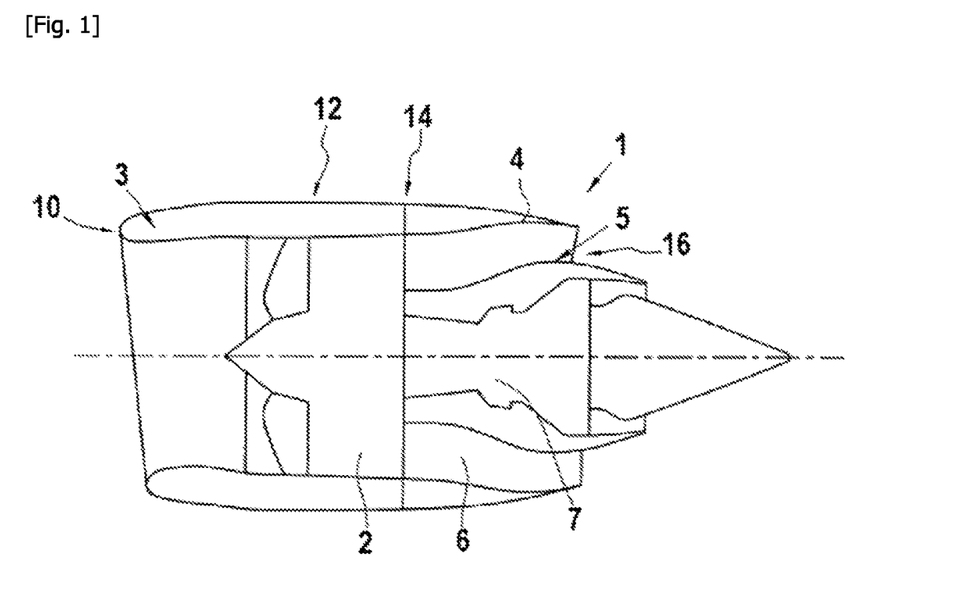
FIG. 1 is a longitudinal section of an aircraft propulsion assembly.

FIG. 1 is a view in longitudinal section of an aircraft propulsion assembly 1 including at least one turbojet engine 2 housed in a nacelle 3. The nacelle 3 has a substantially tubular structure comprising an air inlet 10 upstream of the turbojet engine 2, an intermediate assembly 12 intended to surround a fan of the turbojet engine and a rear assembly 14 which can integrate thrust reversal means and intended to surround the combustion chamber and all or part of the compressor and turbine stages of the turbojet engine. The nacelle 3 is terminated by an ejection nozzle 16 whose outlet is located downstream of the turbojet engine 2.

The nacelle 3 comprises an Outer Fixed Structure 4 (or OFS) and an Inner Fixed Structure 5 (or IFS). These two structures are concentric and define an annular flowpath 6 in which cold air is intended to circulate when the turbojet engine 2 is in operation. The inner fixed structure 5 constitutes the outer shell of the engine compartment 7 of the turbojet engine 2. The example illustrated in FIG. 1 relates to a nacelle 3 housing a bypass turbojet engine 2 able to generate, on the one hand, a stream of hot gases (also called primary stream) derived from the combustion chamber of the turbojet engine and circulating in the engine compartment 7 and, on the other hand, a stream of cold air (called secondary stream) derived from the fan and circulating outside from the engine compartment 7 through the flowpath 6 formed between the inner fixed structure 5 and the outer fixed structure 4. The two streams are ejected from the turbojet engine 2 from the rear of the nacelle 3 through the ejection nozzle 16.

The outer 4 and inner 5 fixed structures of the nacelle 3 are coated with thermal protection. Particularly, the inner fixed structure 5 is subjected to high thermal stresses and is generally protected by thermal and fire protection, making it possible to insulate the remainder of the nacelle from the engine compartment 7 in order to maintain it at an acceptable temperature.

The general structure of a thermal protection used to protect the fixed structures 4 and 5 and the intermediate assembly 12 of the nacelle 3 is known per se. The thermal protection comprises a blanket interposed between two sheets (also called "strips"). During the use and the submission of the thermal protection to the engine environment, it may be damaged and require a repair before restarting the turbojet engine 2.

Figure 2:
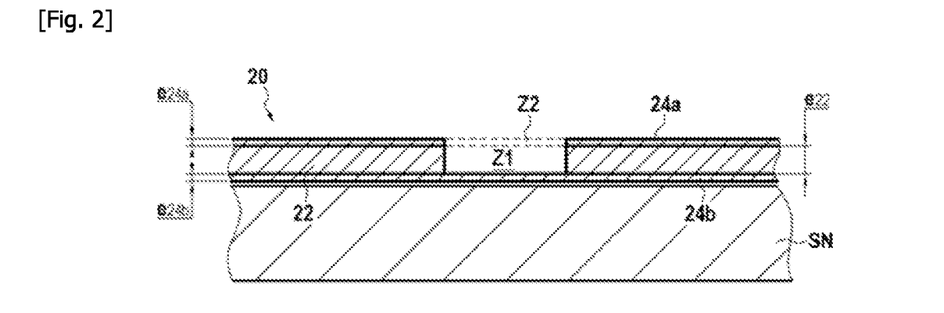
FIG. 2 is a section schematically and partially illustrating a damaged thermal protection intended to be repaired by implementation of one exemplary method according to the invention.

FIG. 2 illustrates the structure of a damaged thermal protection 20 intended to be repaired by implementation of an exemplary method according to the invention. As indicated above, the thermal protection 20 comprises a blanket 22 present between a first sheet 24a and a second sheet 24b. The blanket 22 can be fibrous or microporous. The blanket 22 can comprise inorganic fibers, such as silica fibers or ceramic fibers. In general, the blanket 22 is made of a suitable material and has a sufficient thickness to ensure the desired thermal insulation with respect to the thermal stresses encountered in a turbojet engine nacelle 3 in operation.

The first sheet 24a can be fluid-tight and can be fire-resistant, in particular in the case where the thermal protection 20 coats an inner fixed structure 5 or the intermediate assembly 12 of the nacelle 3. The thermal protection 20 however does not necessarily constitute a fire protection when it coats on an outer structure 4 of the nacelle 3. Of course, there is no departure from the framework of the invention if the protection is a thermal and fire protection and coats an outer structure 4 of the nacelle 3. The first sheet 24a can be metallic, for example made of stainless steel, or made of composite material. By way of example, the thickness $e_{24a}$ of the first sheet 24a can be less than or equal to 1 mm, for example comprised between 0.05 mm and 1 mm. In the case of the inner coating of an inner fixed structure 5 of the nacelle 3, the first sheet 24a is present in the engine compartment 7 and is subjected to the stream of hot gases when the turbojet engine 2 is in operation. The second sheet 24b can be metallic, for example made of stainless steel, or made of composite material. The thermal protection 20 is secured to the nacelle structure SN by a mechanical system such as lock wires or screws/nuts.

The damage to the thermal protection 20 during its operation is materialized by the appearance of areas of lack of material. FIG. 2 represents the fact that the blanket 22 and the first sheet 24a each have an area of lack of material, respectively denoted Z1 and Z2. The area Z2 of lack of material of the first sheet 24a is superimposed on the area Z1 of lack of material of the blanket 22. In the illustration of FIG. 2, the areas Z1 and Z2 of lack of material have a regular shape because they have previously undergone a preliminary material removal treatment so as to give them a predefined shape, here the shape of a quadrilateral, for repair. Other shapes are of course possible for the areas Z1 and Z2 of lack of material. In the particular case where the blanket 22 is microporous, special precautions can be taken after this removal of material by bonding fiber webs to the border of the blanket 22 in order to avoid any risk of loss of fragments of the blanket 22.

A possible damaged thermal protection structure intended to be repaired has just been described. A succession of steps of one exemplary method according to the invention will now be described.

Figure 3:
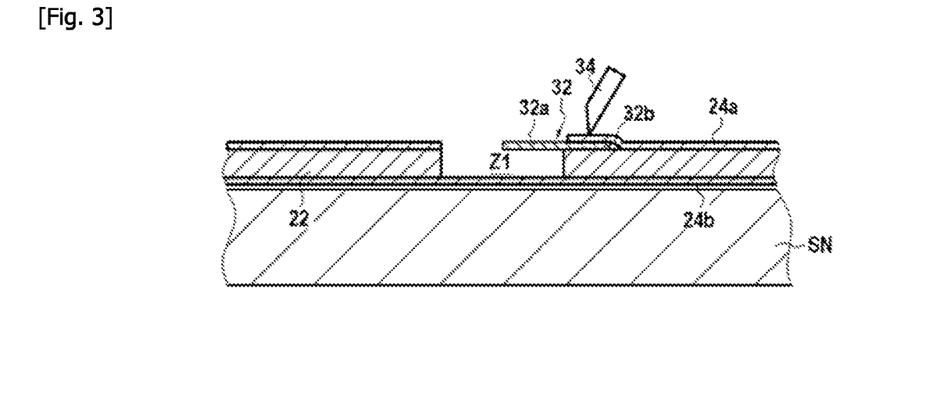
FIG. 3 is a section schematically and partially illustrating the cutting of the slots through the first sheet with a protective element interposed between the cutting area and the thermal insulation blanket.
Figure 4:
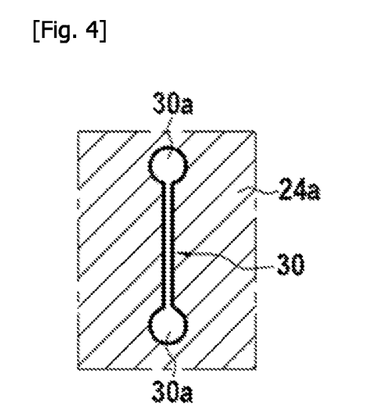
FIG. 4 is a front view illustrating a possible structure for the slots of the first sheet.

FIG. 3 illustrates the cutting of the slots 30 through the first sheet 24a. In the example illustrated, a protective element 32 is interposed beforehand between the blanket 22 and the first sheet 24a. The protective element 32 can be a plate, for example a metal plate. The protective element 32 covers the area Z1 of lack of material of the blanket 22 and extends beyond it. The protective element 32 comprises a first region 32a covering the area Z1 of lack of material of the blanket 22 and a second region 32b interposed between the first sheet 24a and the blanket 22. During the cutting of each slot 30 through the first sheet 24 by the cutting tool 34, the protective element 32 is present between the cutting tool 34 and the blanket 22 so as to protect the blanket 22 from any risk of damage by the cutting tool 34. FIG. 4 illustrates a possible example for the slots 30 made through the first sheet 24a. The slots 30 illustrated have a stop drill 30a at each end. The stop drills 30a can be made with a drill bit. In addition, FIG. 4 illustrates slots having a substantially rectilinear shape. Other shapes can be envisaged such as broken line slots, for example chevron-shaped slots.

Several slots 30 are formed in the thickness of the first sheet 24a, the area Z2 of lack of material of the first sheet 24a is present between the slots 30. The slots 30 can be formed at a distance $d_1$ from the area Z2 of lack of material of the first sheet 24a greater than or equal to 25 mm.

Figure 5:
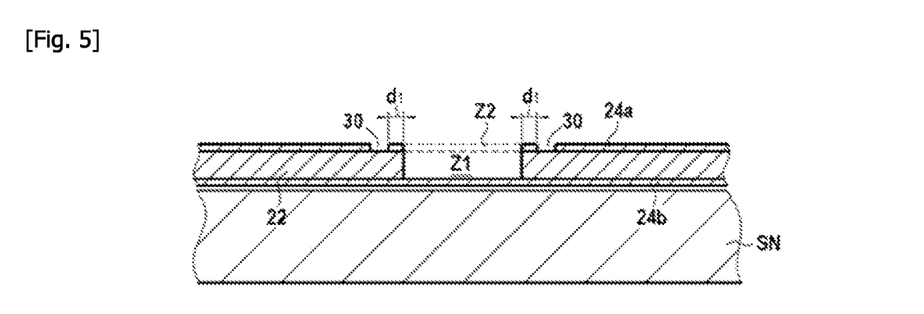
FIG. 5 is a section schematically and partially illustrating the damaged thermal protection with the slots cut through the first sheet on each side of the area of lack of material of the first sheet.
Figure 7:
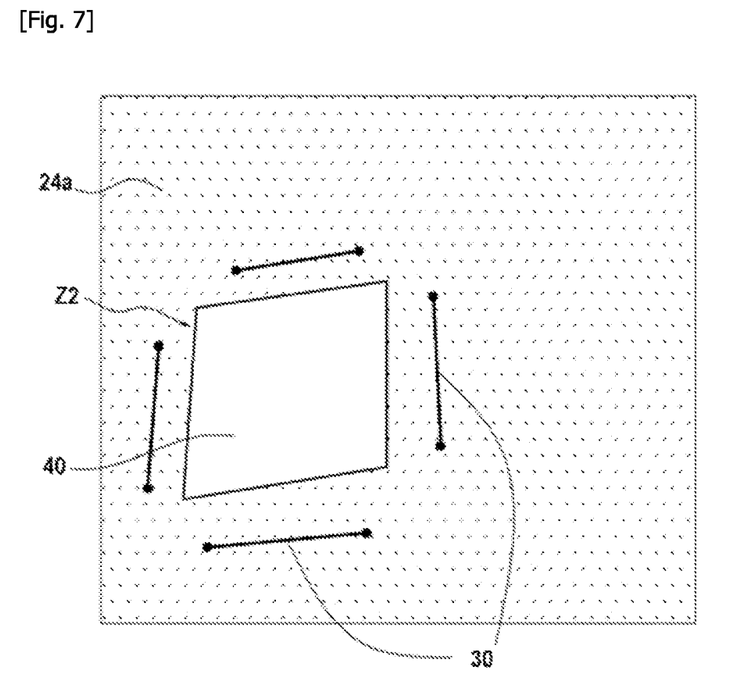
FIG. 7 is a photograph illustrating the slots cut out through the sheet with the positioned repair blanket.

In the example illustrated, four slots 30 have been cut through the first sheet 24a (see FIG. 7). The slots 30 can, as illustrated, be located around the area Z2 of lack of material of the first sheet 24a. More particularly, the area Z2 of lack of material can have the shape of a quadrilateral, here a square, and a slot 30 can be present opposite each side of this quadrilateral. The slots 30 can, as illustrated, be evenly distributed around the area Z2 of lack of material of the first sheet 24a. The number of slots 30 can vary. Indeed, according to another example, only two slots can be formed on either side of the area Z2 of lack of material. In yet another example, three slots or more than four slots can be cut through the first sheet 24a.

Figure 6:
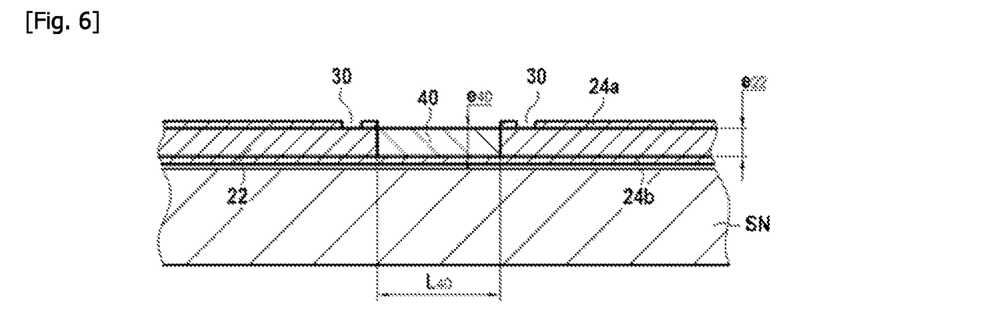
FIG. 6 is a section schematically and partially illustrating the positioning of the repair blanket in the area of lack of material of the blanket.

FIGS. 6 and 7 illustrate the positioning of the repair blanket 40 in the area Z1 of lack of material of the blanket 22 (see also FIG. 7). The proposed figures describe one example in which the cutting of the slots 30 through the first sheet 24a is carried out before the positioning of the repair blanket 40 but there is of course no departure from the framework of the invention if the repair blanket 40 is first positioned and then the slots 30 are cut. The repair blanket 40 has the same shape as the area Z1 of lack of material of the blanket 22 and substantially the same dimensions so as to be in contact or have a limited spacing with the blanket 22 that does not affect the thermal protection capacity. The area Z1 of lack of material can have the shape of a quadrilateral, here a square, like the repair blanket 40. Analogously to what was described above in the particular case where the repair blanket 40 is microporous, special precautions can be taken after cutting of the repair blanket 40 to the desired shape and dimensions by bonding fiber webs to the border of the repair blanket 40 in order to avoid any risk of loss of fragments of the repair blanket 40. It is also possible to round the corners of the quadrilateral defined by the area Z2 of lack of material of the first sheet 24a before the positioning of the repair blanket 40 using for example a pair of scissors. This allows avoiding any risk for the operator to be injured during the positioning of the repair blanket 40 and for the latter to be damaged during this positioning. The characteristics described above for the blanket 22 are applicable to the repair blanket 40. The material forming the repair blanket 40 can be identical to or different from the one forming the blanket 22. The thickness $e_{40}$ of the repair blanket 40 can be substantially equal to the thickness $e_{22}$ of the blanket 22 or differ therefrom, it being understood that this thickness $e_{40}$ remains sufficient for the intended thermal protection application. By way of example, the thermal conductivity related to the thickness (lambda/$e_{40}$ in W/(m$^2 \cdot$K)) of the repair blanket 40 can be less than or equal to the thermal conductivity related to the thickness of the blanket 22 and/or the specific heat of the repair blanket 40 can be greater than or equal to that of the blanket 22. The repair blanket 40 can have a patch shape, as illustrated. The width $L_{40}$ of the repair blanket 40 can be greater than the thickness $e_{40}$ of the repair blanket 40, or greater than or equal to twice this thickness $e_{40}$.

Figure 8:
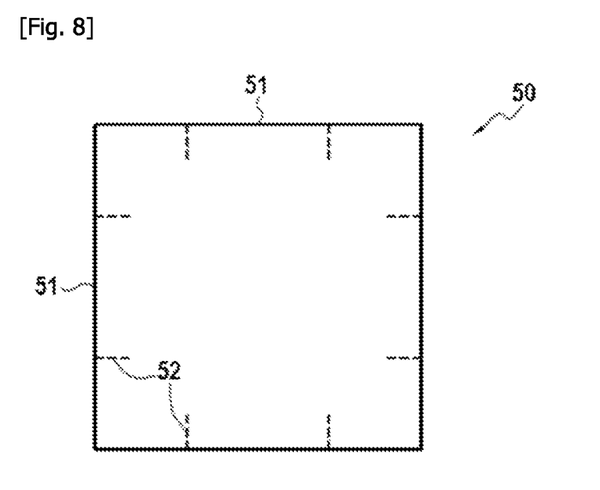
FIG. 8 illustrates the preparation of an exemplary repair sheet intended to be implemented in one exemplary method according to the invention.
Figure 9:
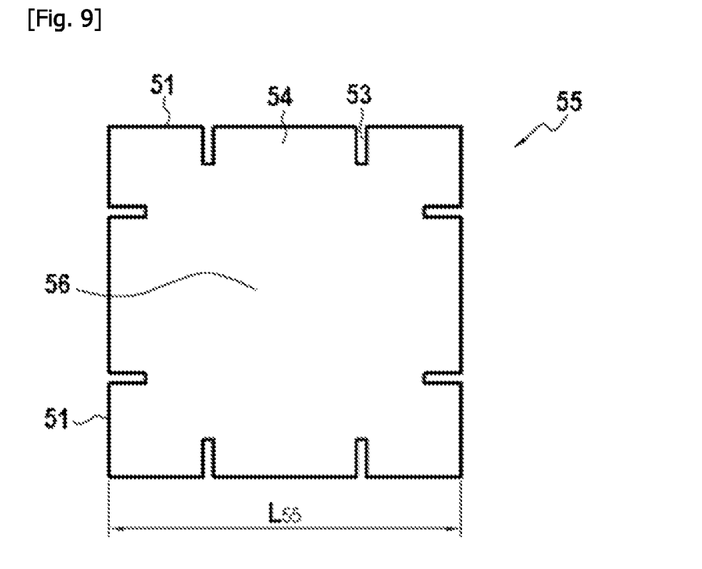
FIG. 9 illustrates an exemplary repair sheet intended to be implemented in one exemplary method according to the invention.

After positioning of the repair blanket 40, the structure to be repaired is closed by adding the repair sheet 55 and fixing it to the first sheet 24a. The repair sheet 55 has previously been prepared to the desired dimensions and shape and is particularly adapted to cover the repair blanket 40 and to present a part that can be inserted through the slots 30. In this regard, FIGS. 8 and 9 illustrate the formation of the lateral tabs 54 which are intended to be inserted through the slots 30. These lateral tabs 54 are here formed by cutting of edges of a blank 50 of the repair sheet. The lateral tabs 54 are here made monolithically with the remainder of the repair sheet. In the example illustrated, the repair sheet 55 has the shape of a quadrilateral, here a square. In this example, cutouts 53 are made transversely, for example perpendicularly, to the circumference 51 of the blank 50 along the cutting lines 52 illustrated in FIG. 8. As many lateral tabs 54 are made as there are slots 30. In the example illustrated, the repair sheet 55 comprises four lateral tabs 54 surrounding a central part 56 of the repair sheet 55. A lateral tab 54 is present on each side of the repair sheet 55 in the example illustrated. The case of four lateral tabs 54 has been represented but, as indicated above for the slots 30, there is no departure from the framework of the invention when the number of lateral tabs 54 is different from four. Lateral tabs 54 having the shape of a quadrilateral have been represented but there is no departure from the framework of the invention when these tabs have a different shape such as a triangular shape for example. There is also no departure from the framework of the invention when the lateral tabs are present on the corners of the repair sheet. In the same way as for the slots 30, the lateral tabs 54 can have a stop drill at their end. By way of example, the thickness $e_{55}$ of the repair sheet 55 can be less than or equal to 1 mm, for example comprised between 0.05 mm and 1 mm. The width $L_{55}$ of the repair sheet 55 can be greater than or equal to twice its thickness $e_{55}$, for example greater than or equal to five times this thickness $e_{55}$.

Figure 10:
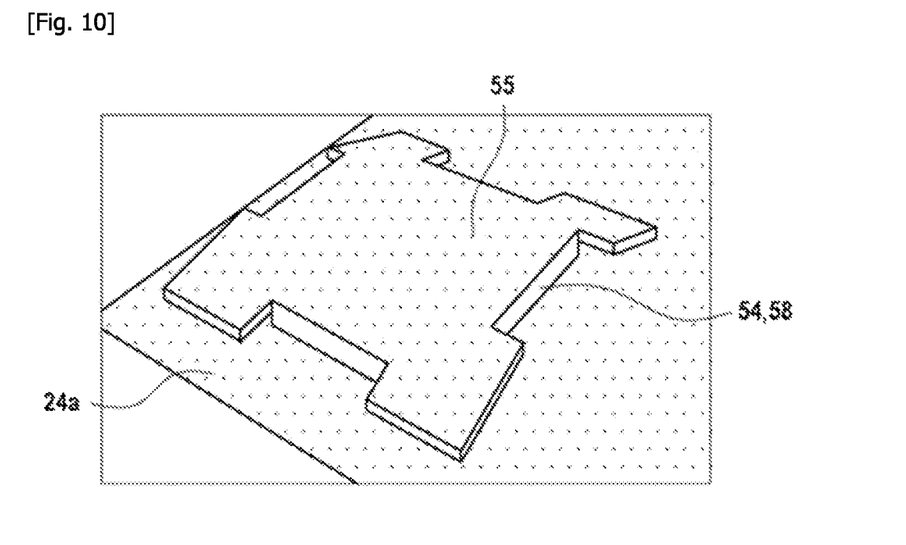
FIG. 10 is a photograph illustrating the positioning of the repair sheet.
Figure 11:
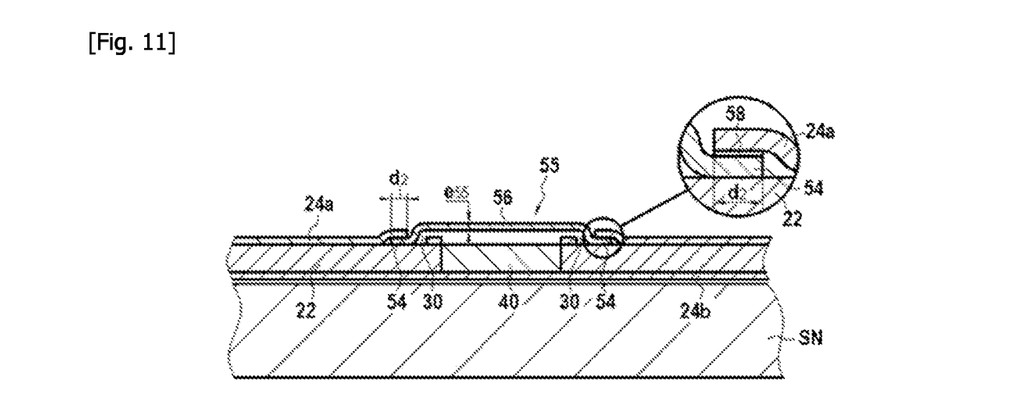
FIG. 11 is a section schematically and partially illustrating the structure obtained after positioning of the repair sheet within the framework of one exemplary method according to the invention.
Figure 12:
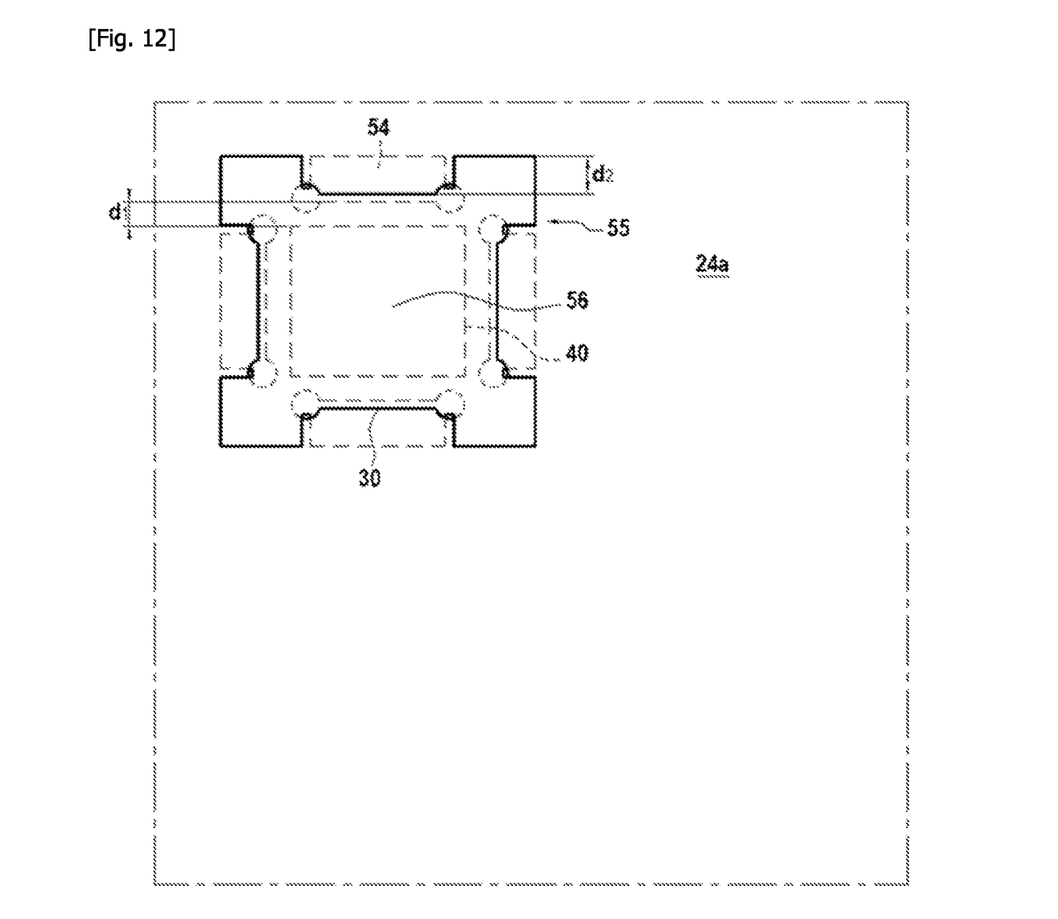
FIG. 12 is a front view schematically and partially illustrating the structure obtained after positioning of the repair sheet within the framework of one exemplary method according to the invention.

The lateral tabs 54 can be folded relative to the remainder of the repair sheet 55 in order to be inserted into the slots 30 arranged through first sheet 24a. Before this insertion, the lateral tabs 54 are coated with a first sealing adhesive 58 on their face intended to be in front of the first sheet 24a after insertion into the slots 30 (see FIGS. 10 and 11). The first sealing adhesive is, of course, compatible with implemented temperatures and constitutes an adhesive known per se. The first sealing adhesive 58 is able to bind the lateral tabs 54 to the first sheet 24a and to make this connection fluid-tight on contact with the thermal protection when the turbojet engine 2 is in operation. The first sealing adhesive 58 can be putty. By way of non-limiting example of usable first sealing adhesive 58, mention may be made to the use of the product marketed under the reference RTV106 by the company MG Chemicals, under the references SILCOSET 152 or AS2500 by the company ACC SILICONES. FIG. 10 illustrates the positioning of the repair sheet 55. To do so, the lateral tabs 54 coated with the first sealing adhesive 58 are folded with respect to the rest of the repair sheet 55 and inserted into the slots 30 in order to slide them under the first sheet 24a and between the first sheet 24a and the blanket 22 as illustrated in FIG. 11. It will be noted that it is also possible to fold the edges of the tabs with respect to the remainder of the tabs in order to avoid damaging the blanket 22. The first sealing adhesive 58 is present between the lateral tabs 54 and the first sheet 24a, once these lateral tabs 54 have been inserted into the slots 30. The distance $d_2$ over which the first sheet 24a covers the lateral tabs 54 can be greater than or equal to 25 mm.

The central part 56 covers part of the first sheet 24a as well as the repair blanket 40. As seen above for the repair blanket 40, the material forming the repair sheet 55 can be identical to or different from the one forming the first sheet 24a as long as it ensures the desired function, for example fire resistance in the case of the coating of an inner fixed structure of the nacelle.

Figure 13:
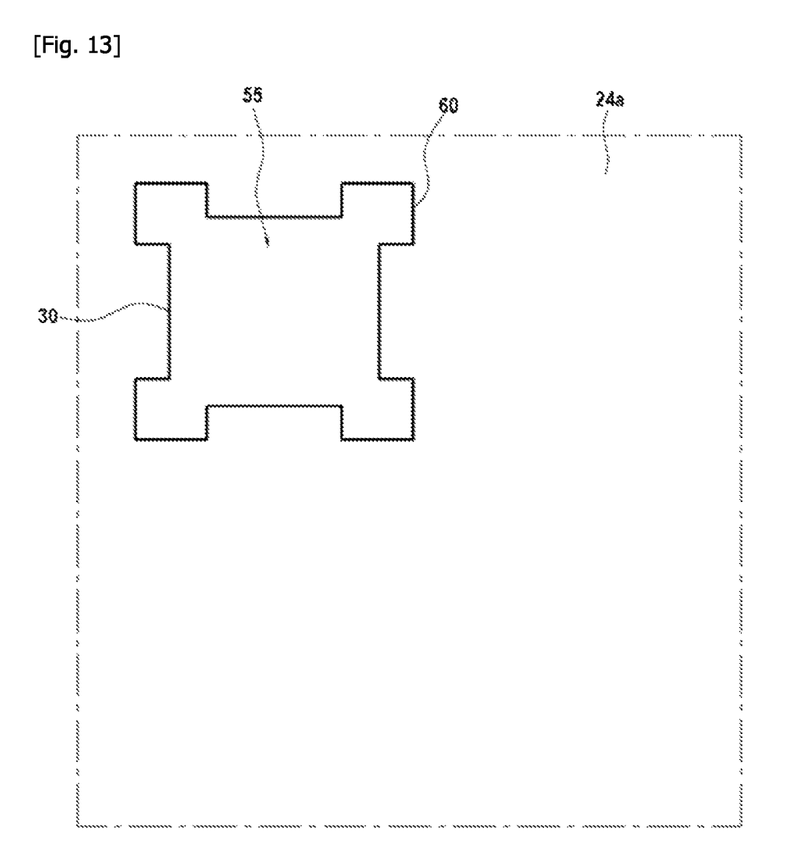
FIG. 13 schematically and partially illustrates the seal formed by depositing of the second sealing adhesive on the repair obtained by implementation of one exemplary method according to the invention.

Once the repair sheet 55 has been positioned and bonded to the first sheet 24a, a second sealing adhesive 60 is deposited on the contour of the repair sheet 55 so as to produce a seal between the repair sheet 55 and the first sheet 24a (see FIG. 13). The second sealing adhesive 60 is deposited on the slots 30 and on the part of the circumference of the repair sheet 55 covering the first sheet 24a. The deposition of the second sealing adhesive 60 can be in the form of a bead. The second sealing adhesive 60 can be identical to or different from the first sealing adhesive 58. The second sealing adhesive is of course compatible with implemented temperatures and constitutes an adhesive known per se. The second sealing adhesive 60 is able to bond the repair sheet 55 to the first sheet 24a and to make this connection fluid-tight on contact with the thermal protection when the turbojet engine 2 is in operation. The second sealing adhesive 60 can be putty. By way of non-limiting example of a second usable sealing adhesive 60, mention may be made to the use of the product marketed under the reference RTV106 by the company MG Chemicals, under the references SILCOSET 152 or AS2500 by the company ACC SILICONES. In the particular case where a thermal protection of the inner fixed structure of the nacelle is repaired, the first and the second sealing adhesive can be fire-resistant. Depending on the damage, it should be noted that it is possible to add mechanical fixings such as for example lock wire.

One example has just been described where the areas Z1 and Z2 of lack of material have the shape of a quadrilateral like the repair blanket 40 and the repair sheet 55. However, there is no departure from the framework of the invention if these elements have other shapes, such as a rounded, for example a circular or an elliptical, shape.

Figure 14:
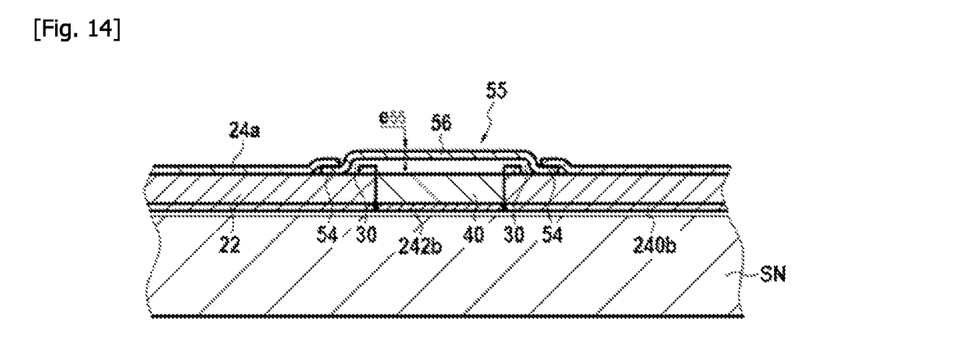
FIG. 14 is a section schematically and partially illustrating the repair obtained by implementation of another exemplary method according to the invention in which the second sheet has also been repaired.

Furthermore, one example has just been described where only the first sheet 24a and the blanket 22 require a repair. According to one variant of the invention, a repair of the second sheet can also be carried out. FIG. 14 illustrates the repair result obtained by using the same references as in the previous figures except for the second sheet which is denoted 240b and for which the second repair sheet is denoted 242b. According to this variant, there was positioning of the second repair sheet 242b in an area of lack of material of the second sheet 240b and securing of the latter, for example by bonding, to the second sheet 240b before the positioning of the repair blanket 40, this repair blanket 40 covering, once positioned, the second repair sheet 242b. The rest of the repair steps are carried out in accordance with what has been described above.

The expression "comprised between . . . and . . . " must be understood as including the bounds.

The invention claimed is:

1. A method for repairing a damaged thermal protection covering a nacelle structure for an aircraft turbojet engine, the damaged thermal protection comprising a thermal insulation blanket present between a first sheet and a second sheet, the second sheet being located on the side of the nacelle structure, the thermal insulation blanket and the first sheet each having an area of lack of material, the method comprising:
    the cutting of slots through the first sheet, the area of lack of material of the first sheet being present between the slots,
    the positioning of a repair thermal insulation blanket in the area of lack of material of the thermal insulation blanket,
    the positioning of a repair sheet after positioning of the repair thermal insulation blanket, the repair sheet comprising a central part and lateral tabs, a first sealing adhesive being applied on the lateral tabs, the positioning of said repair sheet being carried out by inserting the lateral tabs into the slots to interpose them between the thermal insulation blanket and the first sheet and to secure them to the first sheet by the first sealing adhesive, the central part covering the repair thermal insulation blanket after insertion of the lateral tabs into the slots, and
    the depositing of a second sealing adhesive on the contour of the repair sheet thus positioned.

2. The method according to claim 1, wherein the repair sheet has cutouts forming the lateral tabs.

3. The method according to claim 1, wherein the repair sheet comprises at least four tabs present around the central part, each of these tabs being inserted into a distinct slot of the first sheet.

4. The method according to claim 1, wherein the slots are cut through the first sheet with a protective element interposed between a cutting area and the thermal insulation blanket.

5. The method according to claim 1, wherein the second sheet also has an area of lack of material and the method further comprises:
    the positioning of a second repair sheet in the area of lack of material of the second sheet and its securing to the second sheet before the positioning of the repair thermal insulation blanket, the repair thermal insulation blanket covering once positioned the second repair sheet.

6. The method according to claim 1, wherein the damaged thermal protection is a damaged thermal and fire protection and covers an inner fixed structure of the aircraft turbojet engine nacelle.

7. The method according to claim 1, wherein the damaged thermal protection covers an outer fixed structure of the aircraft turbojet engine nacelle.

* * * * *